United States Patent
Giraldo (10) Patent No.: US 9,656,893 B2
(45) Date of Patent: May 23, 2017

(54) SIMULTANEOUS ANOXIC BIOLOGICAL PHOSPHORUS AND NITROGEN REMOVAL WITH ENERGY RECOVERY

(71) Applicant: AMERICAN WATER WORKS COMPANY, INC., Voorhees, NJ (US)

(72) Inventor: Eugenio William Giraldo, Robbinsville, NJ (US)

(73) Assignee: AMERICAN WATER WORKS COMPANY, INC., Voorhees, NJ (US)

( * ) Notice: Subject to any disclaimer, the term of this patent is extended or adjusted under 35 U.S.C. 154(b) by 86 days.

(21) Appl. No.: 14/216,052

(22) Filed: Mar. 17, 2014

(65) Prior Publication Data

US 2014/0197097 A1    Jul. 17, 2014

Related U.S. Application Data

(63) Continuation of application No. 12/981,984, filed on Dec. 30, 2010, now Pat. No. 8,685,246, and a
(Continued)

(51) Int. Cl.
*C02F 3/30* (2006.01)
*C02F 3/12* (2006.01)
*C02F 3/28* (2006.01)

(52) U.S. Cl.
CPC ............ *C02F 3/302* (2013.01); *C02F 3/1268* (2013.01); *C02F 3/2846* (2013.01); *C02F 3/308* (2013.01);
(Continued)

(58) Field of Classification Search
CPC ...... C02F 3/302; C02F 3/1215; C02F 3/1268; C02F 3/1273; C02F 3/28; C02F 3/2846;
(Continued)

(56) References Cited

U.S. PATENT DOCUMENTS

| 5,540,840 A | 7/1996 | Heitkamp et al. |
| 5,650,069 A * | 7/1997 | Hong ............... C02F 3/308 |
| | | 210/605 |

(Continued)

FOREIGN PATENT DOCUMENTS

| CL | 199900683 | 8/1999 |
| JP | S58146495 A | 9/1983 |

(Continued)

OTHER PUBLICATIONS

Non-Final Office Action dated Nov. 4, 2015 in U.S. Appl. No. 14/291,897, 15 pages.
(Continued)

*Primary Examiner* — Fred Prince
(74) *Attorney, Agent, or Firm* — Shook Hardy & Bacon L.L.P.

(57) ABSTRACT

Methods and systems are provided for treating wastewater to simultaneously remove nitrogen, carbon, and phosphorus, while recovering energy in the form of methane and carbon dioxide. An ammonia-containing stream is directed to a pretreatment tank that produces excess sludge, biogas, and a pretreated stream. The pretreated stream has at least 45% less carbon than the ammonia-containing stream. The pretreated stream is then directed to an anoxic tank, which promotes phosphorus release and fermentation of particulate and dissolved organic matter. The mixed liquor is transferred to an aerated tank having low dissolved oxygen concentrations to promote development of phosphorus-release bacteria that is eventually recycled to the anoxic tank by way of the return activated sludge. Simultaneous nitrification, denitrification, and phosphorus release occur in the aerated tank. A membrane tank separates treated effluent from activated sludge in a membrane tank.

19 Claims, 9 Drawing Sheets

Related U.S. Application Data continuation-in-part of application No. 12/886,321, filed on Sep. 20, 2010, now Pat. No. 8,747,671.

(52) U.S. Cl.
CPC .......... *C02F 3/1215* (2013.01); *C02F 3/1273* (2013.01); *C02F 3/28* (2013.01); *C02F 3/307* (2013.01); *C02F 2303/10* (2013.01); *C02F 2303/16* (2013.01); *Y02E 50/343* (2013.01); *Y02W 10/12* (2015.05); *Y02W 10/15* (2015.05); *Y02W 10/30* (2015.05)

(58) Field of Classification Search
CPC .. C02F 3/308; C02F 2303/10; C02F 2303/16; C02F 3/307; Y02E 50/343; Y02W 10/12; Y02W 10/30; Y02W 10/15
USPC ....... 210/603, 605, 621, 623, 630, 252, 259, 210/903, 906
See application file for complete search history.

(56) References Cited

U.S. PATENT DOCUMENTS

| | | | | |
|---|---|---|---|---|
| 5,833,856 | A | * | 11/1998 | Liu .......................... C02F 3/308 210/151 |
| 5,863,433 | A | | 1/1999 | Behrends |
| 6,406,629 | B1 | * | 6/2002 | Husain .................. C02F 3/1268 210/605 |
| 6,712,970 | B1 | * | 3/2004 | Trivedi ................... C02F 3/006 210/605 |
| 6,881,339 | B1 | | 4/2005 | Hogl et al. |
| 7,172,699 | B1 | * | 2/2007 | Trivedi ................. C02F 3/1268 210/210 |
| 7,195,712 | B2 | | 3/2007 | Park et al. |
| 8,685,246 | B2 | | 4/2014 | Giraldo |
| 8,747,671 | B2 | | 6/2014 | Giraldo et al. |
| 9,045,356 | B2 | | 6/2015 | Sun et al. |
| 2002/0040871 | A1 | | 4/2002 | Garcia et al. |
| 2003/0217968 | A1 | | 11/2003 | Goel et al. |
| 2004/0206699 | A1 | | 10/2004 | Ho et al. |
| 2006/0060525 | A1 | * | 3/2006 | Hoffland ............ B01D 21/0012 210/603 |
| 2006/0113243 | A1 | * | 6/2006 | Applegate ............... C02F 3/006 210/605 |
| 2006/0249449 | A1 | * | 11/2006 | Nakhla .................. C02F 3/1273 210/605 |
| 2007/0000836 | A1 | | 1/2007 | Elefritz et al. |
| 2007/0193949 | A1 | * | 8/2007 | You ....................... C02F 3/1273 210/605 |
| 2007/0235385 | A1 | * | 10/2007 | Barnes .................... C02F 3/302 210/605 |
| 2008/0053897 | A1 | | 3/2008 | Zhu et al. |
| 2008/0223784 | A1 | | 9/2008 | Martin et al. |
| 2009/0230040 | A1 | | 9/2009 | Limcaco |
| 2010/0219125 | A1 | | 9/2010 | Northrop et al. |

FOREIGN PATENT DOCUMENTS

| | | |
|---|---|---|
| JP | 2000107787 A | 4/2000 |
| JP | 2001314890 A | 11/2001 |
| JP | 2005211832 A | 8/2005 |
| JP | 2006035138 A | 2/2006 |

OTHER PUBLICATIONS

European Office Action dated Feb. 19, 2016 in European Patent Application No. 11827130.3, 5 pages.
European Office Action dated Feb. 19, 2016 in European Patent Application No. 11827208.7, 5 pages.
European Office Action dated Feb. 23, 2016 in European Patent Application No. 11827190.7, 5 pages.
Final Office Action dated May 11, 2016 in U.S. Appl. No. 14/291,897, 6 pages.
Bernet et al. Combined Anaerobic-Aerobic SBR for the Treatment of Piggery Wastewater Wat. Res. Apr. 17, 2000, pp. 611-619.
Notice of Allowance dated Jul. 22, 2016 for U.S. Appl. No. 14/291,897, 7 Pages.

\* cited by examiner

SIMULTANEOUS ANOXIC BIOLOGICAL PHOSPHORUS AND NITROGEN REMOVAL WITH ENERGY RECOVERY

CROSS-REFERENCE TO RELATED APPLICATIONS

This application is a continuation application of and claims priority to U.S. application Ser. No. 12/981,984 filed Dec. 30, 2010, entitled "SIMULTANEOUS ANOXIC BIOLOGICAL PHOSPHORUS AND NITROGEN REMOVAL WITH ENERGY RECOVERY," which is a continuation-in-part application of and claims priority to U.S. application Ser. No. 12/886,321 filed Sep. 20, 2010, entitled "SIMULTANEOUS ANOXIC BIOLOGICAL PHOSPHORUS AND NITROGEN REMOVAL," both of which are hereby incorporated by reference in their entirety.

BACKGROUND

Removing various components from wastewater, such as nitrogen, carbon, and phosphorus can be a difficult and high-cost process that in some instances may require the addition of a carbon source to wastewater treatment process. Additionally, a high concentration of dissolved oxygen used in many wastewater treatment processes contributes substantially to the cost of energy usage of a wastewater treatment plant. A carbon source, such as methanol, may be added to the process in an anoxic tank, for example, to assist with denitrification. Further, an aerated tank may require high concentrations of dissolved oxygen to promote oxidation of biological oxygen demand (BOD) and ammonia. The addition of a carbon source and the requirement of high concentrations of dissolved oxygen, however, are costly and significantly contribute to the expense of treating wastewater.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In a first aspect, a process is provided for treating wastewater to simultaneously remove organic matter, nitrogen, and phosphorus with energy recovery. The process includes providing an ammonia-containing stream in a pretreatment tank that produces, at least, excess sludge, biogas, and a pretreated stream. The pretreated stream has at least 45% less carbon than the ammonia-containing stream. Further, the biogas comprises at least methane and carbon dioxide. The process additionally includes flowing the pretreated stream and return activated sludge to an anoxic tank operating under anoxic conditions and mixing the pretreated stream and the return activated sludge in the anoxic tank to form a mixed liquor, thereby initiating phosphorus release and fermentation of particulate organic matter and dissolved organic matter. Further, the process includes transferring the mixed liquor to an aerated tank operating under microaerophilic conditions. A concentration of dissolved oxygen in the aerated tank is less than 1.0 mg/l of the mixed liquor, which is effective to promote simultaneous nitrification, denitrification, phosphorous release, and phosphorus uptake. Also, the process includes transferring the mixed liquor to a membrane tank that separates treated effluent from activated sludge containing microorganisms. A first portion of the activated sludge is returned to the anoxic tank as the return activated sludge.

In a second aspect, a method is provided for reducing ammonia in a stream while recovering energy. The method includes providing a stream containing ammonia in a pretreatment tank that comprises anaerobic microorganisms that reacts with the ammonia-containing stream to produce biogas and a pretreated stream. Further, the method includes contacting the pretreated stream with an oxygen-containing stream under effective treatment conditions to form a first product stream, the ratio of ammonia in the pretreated stream to oxygen in the oxygen-containing stream being about 2.28 g O2/g N—NH3 (2.28 grams of oxygen per gram of nitrogen in ammonia) or less. The method additionally includes exposing the first product stream to organic matter under effective treatment conditions in a ratio of about 0.57 g COD/g N—NH3 (0.57 grams of chemical oxygen demand (COD) per gram of nitrogen in ammonia) or less.

In a third aspect, a system for treating wastewater to simultaneously remove organic matter, nitrogen, and phosphorus with energy recovery is provided. The system includes a pretreatment tank that receives plant influent wastewater and that comprises anaerobic microorganisms that reacts with the plant influent wastewater to produce, at least, biogas comprising methane, excess sludge, and a pretreated stream, the pretreated stream having at least 45% less carbon than the plant influent wastewater. The system also includes an anoxic tank that receives the pretreated stream and return activated sludge. The anoxic tank operates under anoxic conditions to promote denitrification, phosphorus release and fermentation of particulate organic matter and dissolved organic matter. Further, the system includes an aerated tank that receives a mixed liquor from the anoxic tank. A concentration of dissolved oxygen in the aerated tank is less than 1.0 mg/l of the mixed liquor to effectively promote development of phosphorus-release bacteria that is present in the return activated sludge received into the anoxic tank. The phosphorus-release bacteria in the return activated sludge allows for the phosphorus release and fermentation of particulate organic matter in the anoxic tank. The system additionally includes a membrane tank that separates plant effluent wastewater from activated sludge, a portion of which is recycled to the anoxic tank as the return activated sludge.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Figure 1:
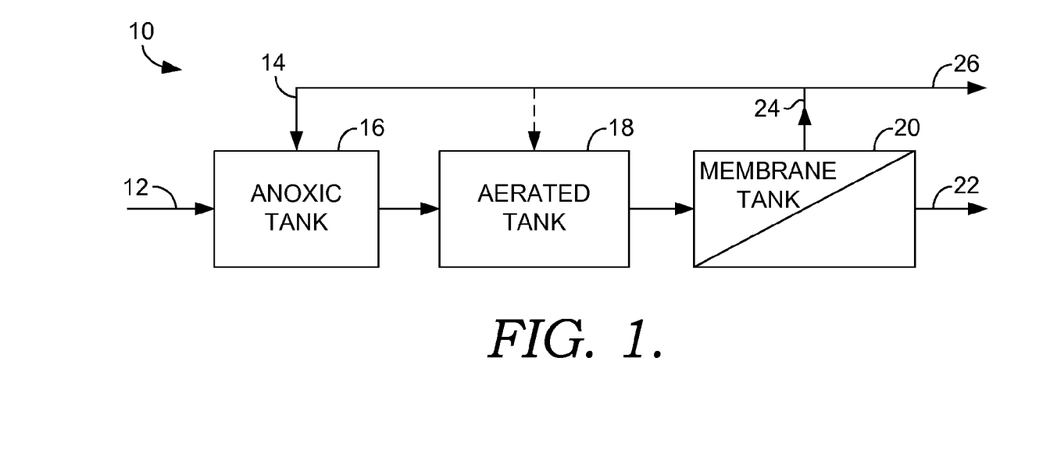
FIG. 1 illustrates a schematic view of a wastewater treatment process, in accordance with an embodiment of the present invention.

FIG. 1 illustrates a schematic view of a wastewater treatment process 10. More specifically, the wastewater treatment process provides an energy and cost efficient method for the simultaneous removal of nitrogen, phosphorus, and organic matter from plant influent wastewater. While many systems require an external carbon source and high levels of dissolved oxygen, embodiments of the present invention do not require either, and in fact require very low amounts of dissolved oxygen and carbon in comparison to amounts typically used in wastewater treatment systems. For instance, many systems require an external carbon source for phosphorus removal and nitrogen removal, but in embodiments of the present invention, nitrogen removal requires only minimum amounts of carbon, as it uses mostly ammonia. Further, phosphorus removal uses dissolved and particulate carbon (e.g., particulate organic matter) that is present in the wastewater, instead of only dissolved carbon or an external carbon source. In the embodiment of FIG. 1, three separate tanks are used to simultaneously remove nitrogen, phosphorus, and organic matter from plant influent wastewater 12. As used herein, plant influent wastewater 12 is raw wastewater that has not yet been treated and therefore has not yet entered a wastewater treatment system, such as the wastewater treatment systems that are described herein.

A first tank shown in FIG. 1 is an anoxic tank 16 that receives at least two streams, including the plant influent wastewater 12 and return activated sludge 14. As will be discussed further herein, the return activated sludge 14 is a portion of activated sludge that is recycled from the third tank, or the membrane tank 20, into one or more of the other tanks, such as the anoxic tank 16. As used herein, activated sludge is a stream that has been separated from the plant effluent. This activated sludge stream contains a microbial mass, in addition to nitrates and dissolved oxygen. The microbial mass includes a variety of biological components, including bacteria, fungi, protozoa, rotifers, etc. While both heterotrophic and autotrophic microorganisms may reside in activated sludge, heterotrophic microorganisms typically predominate. Heterotrophic microorganisms obtain energy from carbonaceous organic matter in plant influent wastewater for the synthesis of new cells. These microorganisms then release energy via the conversion of organic matter into compounds, such as carbon dioxide and water. Autotrophic microorganisms in activated sludge generally reduce oxidized carbon compounds, such as carbon dioxide, for cell growth. These microorganisms obtain their energy by oxidizing ammonia to nitrate, known as nitrification, which is further described herein.

As mentioned above, the return activated sludge 14 is a portion of the activated sludge that is produced by the separation step (e.g., membrane tank or membrane bioreactor) at the end of the treatment process. The return activated sludge 14 is recycled into the anoxic tank 16 and provides the tank with microbial mass, residual oxygen, nitrates, and nitrites. It should be noted that phosphorus release typically does not occur in anoxic tanks with return activated sludge having nitrates and dissolved oxygen, but in embodiments of the present invention, phosphorus release does occur in the anoxic tank 16. Phosphorus release occurs because the bacteria that is used to consume phosphorus is also present in the return activated sludge 14. Additionally, phosphorus release occurs because of active hydrolysis and fermentation conditions of particulate organic matter present in the influent wastewater. As used herein, hydrolysis is the breakdown of polymeric organic matter into monomers by microbial action. In one embodiment, hydrolysis refers to a chemical reaction during which molecules of water are split into hydrogen cations and hydroxide anions in the process of a chemical mechanism. This type of reaction is used to break down certain polymers. As such, instead of just using dissolved organic matter as the carbon source for phosphorus removal, embodiments of the present invention allow for both dissolved and particulate organic matter to be used as a carbon source for phosphorus removal. Normally particulate organic matter cannot be used, but because it is fermented here, it can be used as a carbon source, thus eliminating the need for an external carbon source.

In wastewater, organic matter occurs as particulate organic matter and dissolved organic matter. Three main tests are used for determining the organic matter in wastewater. These include biological oxygen demand (BOD), total organic carbon (TOC), and chemical oxygen demand (COD). Unlike dissolved organic matter, particulate organic matter takes the form of suspended solids found in wastewater. As further discussed herein, particulate organic matter undergoes the process of hydrolysis to convert the particulates into soluble solids, thus allowing for higher rates of phosphorus removal when embodiments of the present invention are utilized.

Phosphorus release and phosphorus uptake refer to the process of phosphorus accumulating organisms (PAOs) storing polyphosphate as an energy reserve in intracellular granules. In anaerobic conditions, the PAOs release orthophosphate, utilizing the energy to accumulate simple organics and store them as polyhydroxyalkanoates (PHAs). In aerobic conditions, or at least conditions where there is some oxygen, nitrites, or nitrates present, the PAOs grow on the stored organic material, using some of the energy to take up orthophosphate and store it as polyphosphate. As such, when the PAOs store carbon for future growth, the PAOs also release phosphorus, sometimes simultaneously. When the PAOs use stored carbon, they uptake phosphorus using preferentially nitrite as an electron acceptor. As will be further described herein, an aerated tank has low levels of dissolved oxygen, but the PAOs still uptake phosphorus. When oxygen, nitrite, or nitrate is present, the PAOs can get energy out of the carbon. Therefore when carbon is abundant, the PAOs store it in their cells and wait until there are conditions where an electron acceptor is present so that they can use the carbon for growth and uptake phosphorus. The phosphate is then removed in the waste activated sludge 26, which is generally the activated sludge that is not recycled to the anoxic tank 16. The development of the PAO population will be discussed further herein. The anoxic tank 16 operates under anoxic conditions such that there is little to no dissolved oxygen, but nitrates (e.g., NO2 and NO3) may be present. A continuous oxygen deficit is maintained in the anoxic tank.

The anoxic tank 16, in one embodiment, has a mixer that mixes the plant influent wastewater 12 and the return activated sludge 14 to form a mixed liquor. The mixed liquor, as used herein, simply refers to a mixture of plant influent wastewater 12 and return activated sludge 14. The rate of mixing may be adjusted, in addition to adjusting the flow rate of the return activated sludge 14, to control the phosphorus release in the anoxic tank 16. It should be noted that the addition of an external carbon source, such as methanol, is avoided in embodiments of the present invention such that there is no additional carbon source needed to carry out embodiments of the present invention. In addition to phosphorus release, denitrification also occurs in the anoxic tank 16. Denitrification is the breakdown of nitrites or nitrates to give off nitrogen gas, and occurs as microbes consume oxygen from the nitrites or nitrates. More specifically, denitrification is a microbially facilitated process of dissimilatory nitrate reduction ultimately producing molecular nitrogen (N2), which is returned to the atmosphere. Nitrates and nitrites are converted into nitrogen gas by way of a denitrification process. Denitrification generally reduces oxidized forms of nitrogen in response to the oxidation of an electron donor, such as organic matter which, here, is present in the return activated sludge 14. This process is performed primarily by heterotrophic microorganisms in an environment where oxygen is depleted, or where oxygen consumption exceeds the rate of oxygen supply, such as the anoxic tank 16 and the aerated tank 18. Utilizing embodiments of the present invention, the denitrification process is also conducted by autotrophic nitrifiers under conditions of low dissolved oxygen in the anoxic tank 16 and the aerated tank 18. The following reactions illustrate the denitrification process, including an illustrative redox reaction:

(1)

(2)

Particulate organic matter and dissolved organic matter from the plant influent wastewater 12 are fermented in the anoxic tank. The conditions in the anoxic tank in embodiments of the present invention induce high rates of hydrolysis and fermentation of particulate organic matter, which provides fermented organic matter in excess of what is needed for the denitrification reaction, allowing for simultaneous release of phosphorus and the formation of PHAs. The fermentation of particulate organic matter allows for additional carbon to be used for phosphorus removal. The average detention time of the influent wastewater flow in the anoxic tank may vary from one hour to ten hours. In one embodiment, the dissolved oxygen concentration in the anoxic tank is less than 0.3 mg/L. In further embodiments, the dissolved oxygen concentration in the anoxic tank is less than 0.2 mg/L. In an even further embodiment, the dissolved oxygen concentration in the anoxic tank is 0.1 mg/L or less. Further, recirculation rates of the return activated sludge may vary between 0.3 to 6 times the influent flow rate.

The anoxic mixed liquor is transferred to an aerated tank 18. While a single aerated tank 18 is illustrated in FIG. 1, multiple aerated tanks may be used, and may be configured either in parallel or in series. Alternatively, one aerated tank may be used, but the aerated tank may have more than one compartment through which the mixed liquor flows. The purpose of having more than one compartment is to improve the kinetic conditions of the overall process minimizing tank volume. Optionally, a portion of the activated sludge is transferred into the aerated tank to provide an additional microbial population needed to ferment the particulate and dissolved organic matter and to promote phosphorus release. This is advantageous in those cases where the nitrate concentrations in the membrane tank are excessively high. Unlike many aerated tanks, the aerated tank 18 provided for in embodiments of the present invention is operated under very low dissolved oxygen concentrations, such as microaerophilic conditions, which promotes the development of the microbial population (e.g., phosphate accumulating organisms (PAO)) used for phosphorus release and uptake. Generally, this bacterial population is capable of storing phosphorus, such as in the form of polyphosphates, and metabolizes it for energy production and cell synthesis, resulting in the removal of phosphorus from the system through the activated sludge. This particular microbial population is unable to develop where there are high concentrations of dissolved oxygen. Since this particular bacterial population is able to develop in the aerated tank 18, it is also present in the return activated sludge 14 that is recycled to the anoxic tank 16, thereby allowing for phosphorus release in the anoxic tank 16. Phosphorus uptake may occur simultaneously with phosphorus release in the aerated tank 18.

In addition to phosphorus release and phosphorus uptake, nitrification and denitrification also occur in the aerated tank 18. In one embodiment, nitrification, denitrification, and phosphorus release occur simultaneously in the aerated tank 18. As previously described, denitrification is a microbially facilitated process of dissimilatory nitrate reduction that ultimately produces nitrogen gas by reducing oxidized forms of nitrogen. Nitrification, on the other hand, is the breakdown of ammonia into nitrate and water. More particularly, nitrification is the biological oxidation of ammonia with oxygen into nitrite followed by the oxidation of nitrites into nitrates. Two groups of organisms are generally responsible for the oxidation of ammonia into nitrite. These two groups are ammonia-oxidizing bacteria (AOB) and ammonia-oxidizing archaea (AOA). A second group is nitrite oxidizing bacteria, NOB, is responsible for oxidation of nitrites to nitrates. The following equations represent the nitrification process:

$$NH_3+CO_2+1.5O_2+AOA/AOB \rightarrow NO_2^-+H_2O+H^+ \quad (3)$$

$$NO_2^-+CO_2+0.5O_2+NOB \rightarrow NO_3^- \quad (4)$$

$$NH_3+O_2 \rightarrow NO_2^-+3H^++2e^- \quad (5)$$

$$NO_2^-+H_2O \rightarrow NO_3^-+2H^++2e^- \quad (6)$$

In embodiments of the present invention, however, the reactions represented by equations (4) and (6) occur at a minimum, thus reducing the need for oxygen and obtaining significant savings in energy usage. In some embodiments, very little to no nitrates are found in the mixed liquor because reactions (4) and (6) are such a small percentage of the overall process such that in equation (1) above, it is mainly nitrites rather than nitrates being converted to nitrogen gas. As such, in equation (2), there are less than 10 electrons needed to convert nitrite to nitrogen gas. In embodiments of the present invention, these electrons, rather than coming from methanol or another external carbon source, come from ammonia. In embodiments of the present invention, PAO bacteria can also use nitrites as electron acceptors for denitrification. This will be discussed in more detail below. As shown by reactions (3) and (5) above, ammonia is used to convert nitrites into nitrogen gas. As an external carbon source is not required, some of the ammonia is used for reactions (3) and (5), but some of the ammonia is also used as a reducing source of electrons for denitrification. This is how nitrification and denitrification can occur in systems with low oxygen concentrations and without an external carbon source.

Further, the microaerophilic conditions allow for fermentation of particulate and dissolved organic matter in the aerated tank 18, which would not typically occur with higher concentrations of dissolved oxygen.

As mentioned above, nitrification and denitrification occur in both the anoxic and aerated tanks, according to embodiments of the present invention. Conventional nitrification-denitrification is represented by reactions (7), (8), and (9) below. Reaction (9) is the net of reactions (7) and (8). Many times, this sequence of reactions requires a high concentration of dissolved oxygen and an external carbon source. Here, about 4.57 grams of O2 per gram of N—NH3 are required for reaction (7) and about 2.86 grams of COD-O2 per gram of N—NO3 are required for reaction (8). The equations are as follows:

$$1NH_3+2O_2 \rightarrow 1HNO_3+H_2O \quad (7)$$

$$1HNO_3+\text{Organic Matter} \rightarrow \tfrac{1}{2}N_2+H_2O \quad (8)$$

Reactions (9) and (10) below illustrate a process called a nitrification shortcut where the initial reaction, or reaction (10), is driven only to nitrite, which results in a savings in the needs of both oxygen demand and organic matter. About 3.43 grams of O2 per gram of N—NH3 is required for reaction (9) and about 1.71 grams of COD-O2 per gram of N—NH3 are required for reaction (10). In one instance, when comparing the first set of reactions above (reactions (7)-(8)) to the second set of reactions below (reactions (9)-(10)), the oxygen demand is decreased by about 25% (4.57 g O2/g N—NH3–3.43 g O2/g N—NH3=1.15 g O2/g N—NH3) and the need for organic matter is decreased by about 40% (2.86 g O2/g N—NO3–1.71 g O2/g N—NH3=1.15 g COD/g N—NH3). This set of reactions occurs in the anoxic tank and the aerated tank with PAO bacteria, which preferentially catalyze reaction (10) below.

$$1NH_3+\tfrac{3}{2}O_2 \rightarrow 1HNO_2+1H_2O \quad (9)$$

$$1HNO_2+\text{Organic Matter} \rightarrow \tfrac{1}{2}N_2+H_2O \quad (10)$$

The set of reactions below labeled (11) and (12) occur in the anoxic tank and the aerated tank. In some instances, this set of reactions is referred to as a nitrifier-denitrification process. As shown in equation (11), ammonia and oxygen are converted into nitrogen gas, nitrous acid, and water. Organic matter is then used to convert the nitrous acid into nitrogen gas, water, and carbon dioxide. About 2.28 grams of O2 per gram of N—NH3 is required for reaction (11) and about 0.57 grams of COD per gram of N—NH3 is required for reaction (12). When comparing the three sets of reactions, this third set of reactions (reactions (13)-(15)) requires the least amount of oxygen. The savings in organic matter is about 80% (2.86 g O2/g N—NO3–0.57 g COD/g N—NH3=2.29 g O2/g N) when comparing the amount of organic matter required for the third set of reactions below to the first set of reactions (reactions (7)-(8)). Further, the savings in oxygen required between the first and the third set of equations is about 50% (4.57 g O2/g N—NH3–2.28 g O2/g N—NH3=2.28 g O2/g N).

$$1NH_3+1O_2 \rightarrow \tfrac{1}{3}N_2+\tfrac{1}{3}HNO_2+\tfrac{1}{3}H_2O \quad (11)$$

$$\tfrac{1}{3}HNO_2+\text{Organic Matter} \rightarrow \tfrac{1}{6}N_2+H_2O+CO_2 \quad (12)$$

Returning to FIG. 1, the mixed liquor is then transferred from the aerated tank 18 to a third tank, here shown as a membrane tank 20, for a solid-liquid separation step where the microorganisms are separated from the treated water. In activated sludge processes, such as those described herein, the dissolved organic pollutants are transformed into water, carbon dioxide, and biomass, which results in an excess production of sludge. The membrane tank 20 separates this sludge from the treated plant effluent 22. In one embodiment, the membrane tank is a membrane bioreactor that is a combination of a membrane process (e.g., microfiltration, ultrafiltration, hollow fiber, flat sheet, tubular) with a suspended growth bioreactor. A bioreactor refers to a device that supports a biologically active environment. Because a bioreactor must be associated with a separation unit to recover the biomass and the purified liquid, and of the inefficiencies and inconvenience of separate units, membrane bioreactors are used to provide the same or better results, but in a single unit. As such, a membrane bioreactor is an association of a biologic reactor and a cross-flow filtration. In one instance, the membrane tank 20 is aerated to provide water turbulence for scouring the submerged membrane filter. In one embodiment, the membrane filter utilized microfiltration, but in another embodiment, ultrafiltration is used.

The result of the membrane filtration occurring in the membrane tank 20 is at least two exit streams, including treated plant effluent 22 and activated sludge 24, a portion of which is recycled to the anoxic tank 16, and in some embodiments, to the aerated tank 18. As used herein, treated plant effluent 22 is the stream exiting the third tank that has been treated for the removal of carbon, nitrogen, phosphorus, and other unwanted constituents. The excess activated sludge is shown as activated sludge 26. The amount of activated sludge 24 that is recycled to the anoxic tank 16 varies, but in some embodiments ranges anywhere from 50% to 600% of the amount of plant influent wastewater 12 entering the anoxic tank 16. As such, for every one gallon of plant influent wastewater 12, 0.5 to 6 gallons of return activated sludge 14 may be added to the anoxic tank 16. In an alternative embodiment, the third tank in the embodiment of FIG. 1, although illustrated as a membrane tank 20, is a clarifier. Clarifiers are tanks used to separate, thicken, and recycle the activated sludge. Typically, clarifiers have a much larger footprint than membrane bioreactors.

Figure 2:
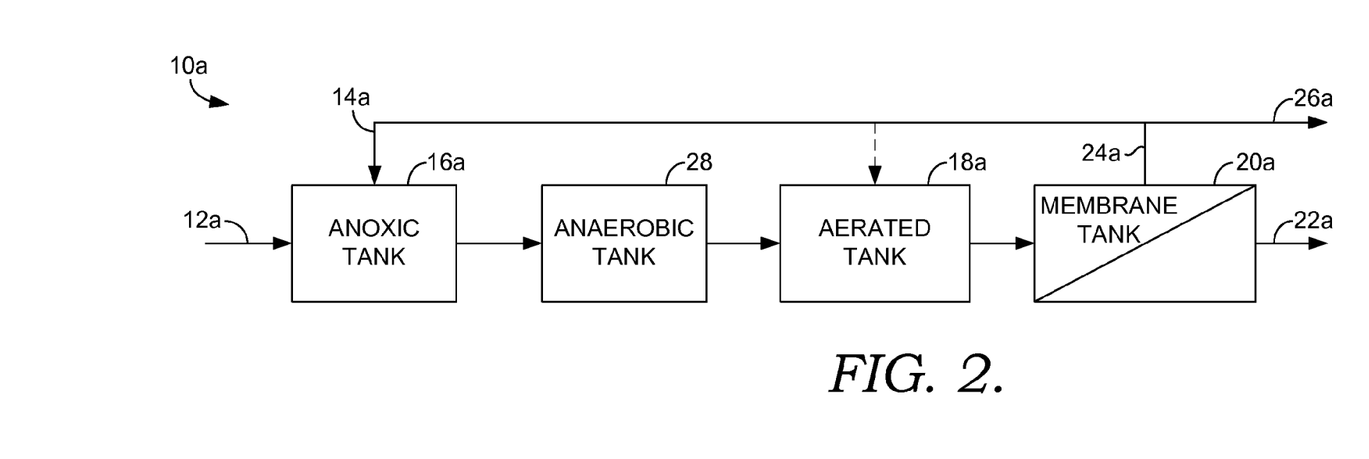
FIG. 2 illustrates a schematic view of an alternate wastewater treatment process, in accordance with an embodiment of the present invention.
Figure 3:
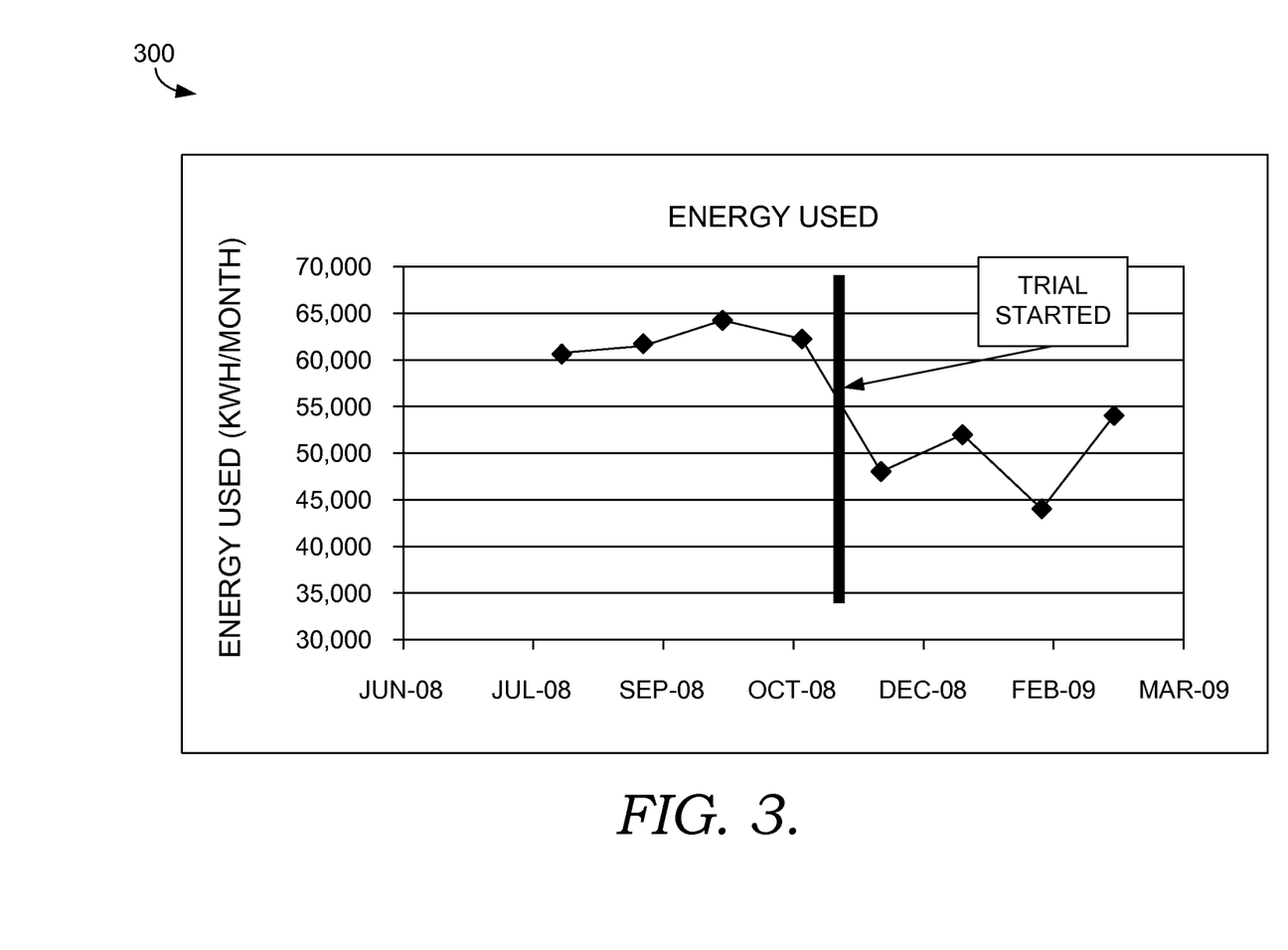
FIG. 3 illustrates a decrease of energy usage at a wastewater treatment plant as a result of implementation of embodiments of the present invention.

Referring now to FIG. 2, a schematic view is illustrated of an alternate wastewater treatment process. An anoxic tank 16a, an aerated tank 18a, and a membrane tank 20a are illustrated in the embodiment of FIG. 2 and operate similarly to those described in FIG. 1. Here, an anaerobic tank 28 is added downstream of, or after the anoxic tank 16a and upstream of, or before the aerated tank 18a. Generally, the anaerobic tank 28 operates under anaerobic conditions, or under the absence of oxygen. The anaerobic tank 28 is a non-aerated tank, such that there is no added oxygen and there are no nitrates. The contents are mixed in the anaerobic tank 28 such that a mixer is present. The embodiment of FIG. 2, or specifically where an anaerobic tank 28 is added to the system, is used in conditions where the characteristics of the organic matter present in the influent wastewater stream are such that additional retention time is needed for both hydrolysis and fermentation of the particulate organic matter. In one embodiment, additional phosphorus release takes place in the anaerobic tank 28. Similar to that described in FIG. 1, plant influent wastewater 12a is mixed with return activated sludge 14a in an anoxic tank 16a. The mixed liquor is first transferred to an anaerobic tank 28, then to an aerated tank 18a, and finally to a membrane tank 20a. Exiting from the membrane tank 20a is treated plant effluent 22a and activated sludge 24a. A portion of the activated sludge 24a is recycled to the anoxic tank 16a as return activated sludge 14a, and optionally, a portion is also recycled to the aerated tank 18a. The waste activated sludge 26a, in one embodiment, is disposed of FIG. 3 illustrates a line graph 300 showing a decrease of energy usage at a wastewater treatment plant as a result of the implementation of embodiments of the present invention. As mentioned, when dissolved oxygen concentrations are kept to a minimum in the aerated tank, energy usage costs significantly decrease, as the addition of dissolved oxygen costs may account for up to 50% of total energy costs for a wastewater treatment plant. As indicated by "trial started," the technology described herein was tested and it was found that energy costs significantly decreased at least partially due to the low amounts of dissolved oxygen required in the aerated tank. As shown, before the trial, the highest energy usage is about 64,000 kWh/month, while the highest after the trial is about 54,000 kWh/month, although the levels reached much lower amounts for previous months.

Figure 4:
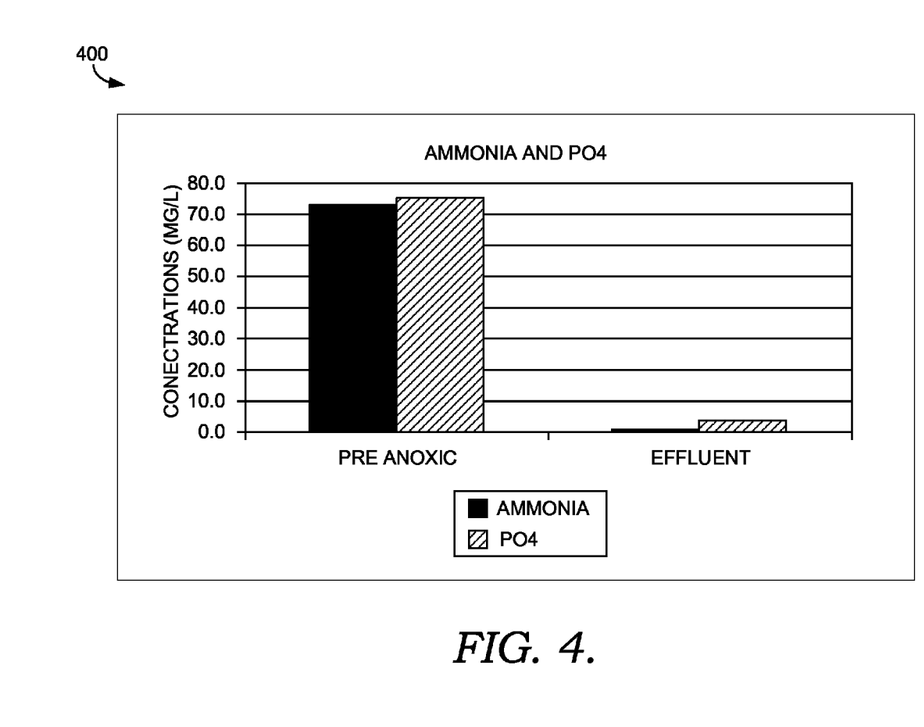
FIG. 4 illustrates a decrease of both ammonia and phosphate when embodiments of the present invention are implemented in a wastewater treatment plant.

Turning now to FIG. 4, a bar graph 400 is illustrated that shows a decrease of both ammonia and phosphate when embodiments of the present invention are implemented in a wastewater treatment plant. As shown here, influent concentrations of ammonia were around 72 mg/l, but dropped to around 1 mg/l after the plant influent wastewater was treated using the treatment methods described herein. Further, influent concentrations of phosphate dropped from around 74 mg/l to around 4 mg/l after the plant influent wastewater was treated using the treatment methods described herein.

Example

The following example illustrates a plant that has two parallel trains, including a first train (train A) and a second train (train B). The tanks in each trains are identical and are in the same location. The conditions in the tanks, however, are different. Train A represents a typical process that would occur without the user of embodiments of the present invention, while train B represents a process that uses embodiments of the present invention, such as a low dissolved oxygen concentration in the aerated tank, as previously discussed. For example, as shown below in Table 1, the dissolved oxygen concentration in the aerated tank of train A is 1.3 mg/l, while the dissolved oxygen concentration in the aerated tank of train B is 0.1 mg/l. As shown by the levels of phosphorus and nitrate/nitrite removal, in train B compared with those of train A, the lower levels of dissolved oxygen in the aerated tank allow for the development of the phosphorus-removal bacteria in the aerated tank. These phosphorus-removal bacteria are then present in the return activated sludge (not shown) from the membrane tank back to the anoxic tank. Phosphorus release is observed in the anoxic tank of train B, while not in the anoxic tank of train A. Net phosphorus uptake takes place in the aerated tank of train B and not in the aerated tank of train A. Therefore, higher levels of phosphorus uptake and removal in the process occur. As a result, the levels of phosphorus in the membrane tank or the plant effluent are 3.65 mg/l for train B, which is much lower than the levels in the membrane tank for train A, which are 7.41 mg/l. Similarly, simultaneous nitrification-denitrification take place in the aerated tank of train B while only nitrification takes place in the aerated tank of train A, as reflected by the significantly higher difference in nitrate concentration. The levels of nitrates/nitrites in the membrane tank for train B are 7.15 mg/l, which is lower than the 8.31 mg/l levels in the membrane tank of train A.

Figure 5:
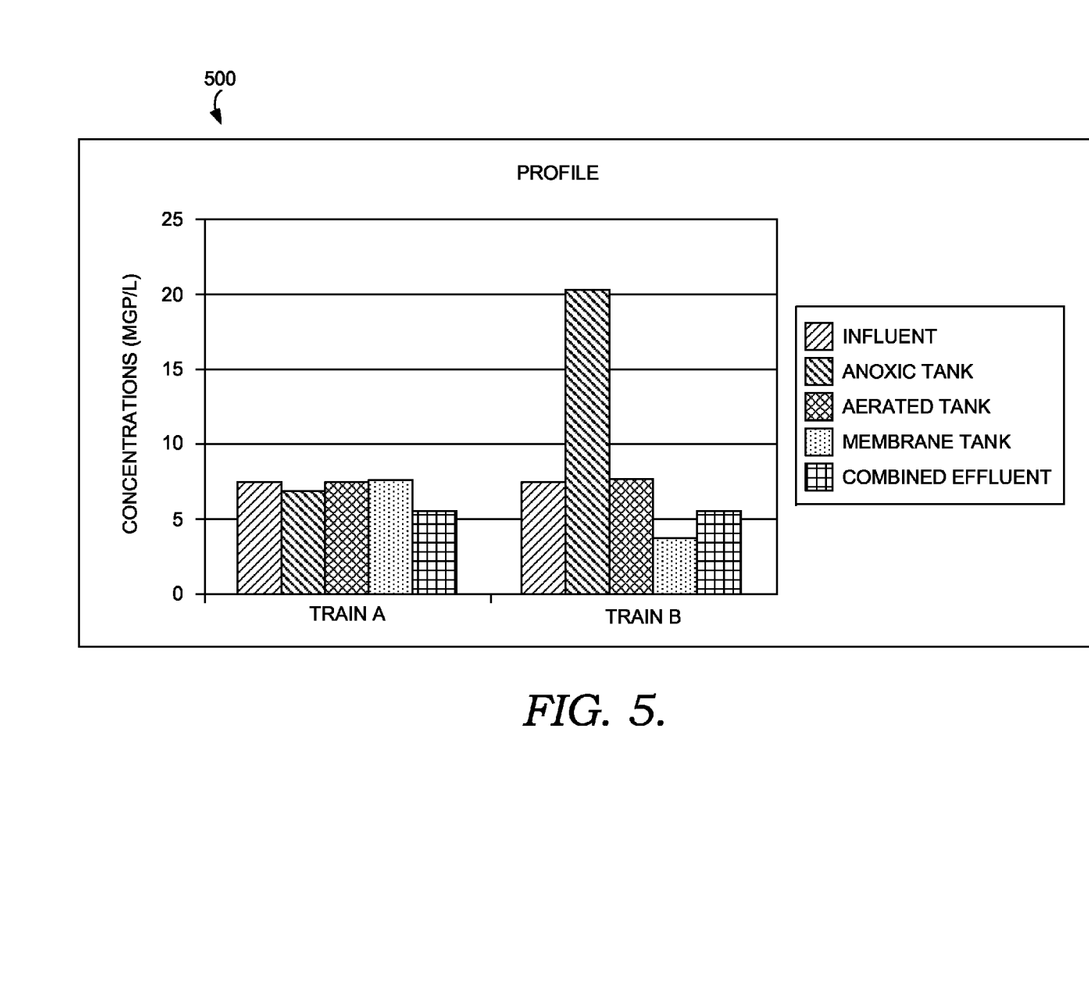
FIG. 5 illustrates a bar graph showing the concentrations of phosphorus, dissolved oxygen, and nitrates in each tank.

Continuing with the example described above and illustrated in Table 1 below, FIG. 5 illustrates a bar graph 500 showing the concentrations of phosphorus, dissolved oxygen, and nitrates in each tank. In comparing the levels of phosphorus, for example, it can be seen that the levels are much lower in the membrane tank for train B than for train A, which is due, in part, to the low dissolved oxygen concentrations in the aerated tank.

TABLE 1

Concentrations of dissolved oxygen, phosphorus, and nitrates in a typical process (Train A) and processes using embodiments of the present invention (Train B).

Figure 6:
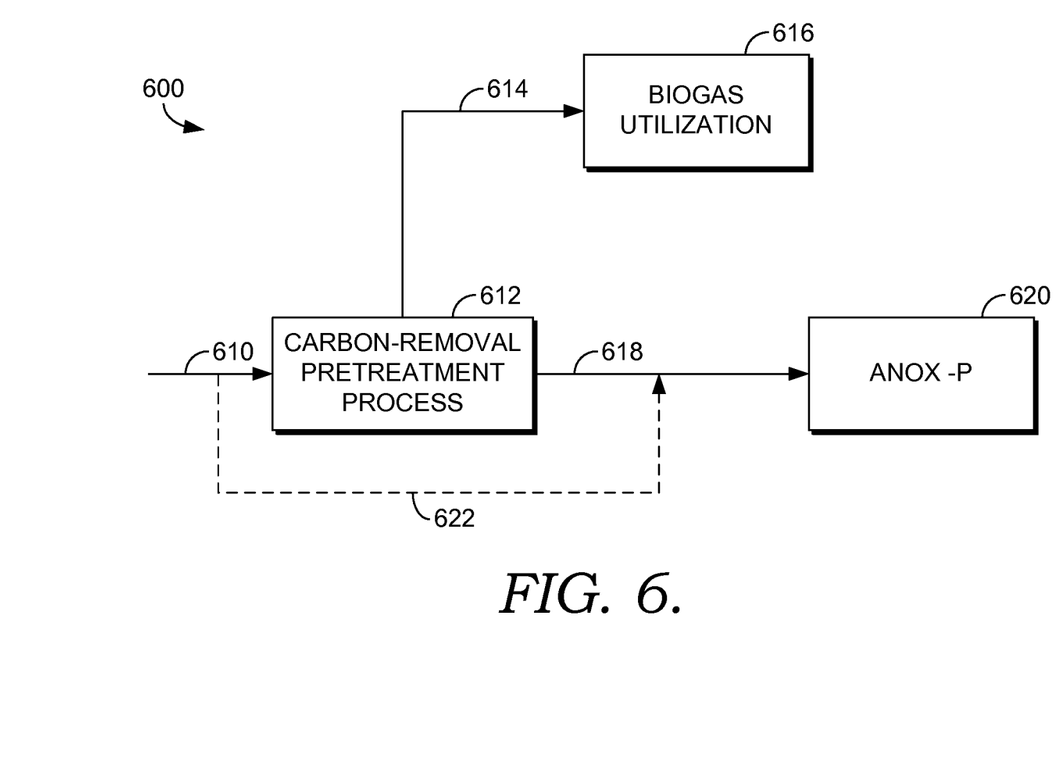
FIG. 6 illustrates a schematic view of a wastewater treatment process with energy recovery, in accordance with an embodiment of the present invention.

Turning now to FIG. 6, a schematic view 600 of a wastewater treatment process with energy recovery is illustrated, in accordance with an embodiment of the present invention. Embodiments of the present invention described herein are referred to in FIG. 6 as the Anox-P process 620. The Anox-P process 620, in embodiments, refers to systems such as that depicted in FIG. 1 that includes an anoxic tank, at least one aerated tank, and a membrane tank. However, in the embodiment of FIG. 6 prior to the Anox-P process 620, a carbon-removal pretreatment process 612 is added to the overall process. The functionality of the carbon-removal pretreatment process 612 is to remove a substantial amount of the carbon from the incoming plant influent wastewater 610. Generally, soluble organic matter and particulate organic matter are converted into an insoluble gas, herein referred to as biogas 614. Because the Anox-P process 620 as described herein requires less carbon than other systems, the amount of carbon present in the plant influent wastewater 610 may be greater than what is actually needed. Other wastewater systems require much more carbon (e.g., to remove nitrogen) such that using a carbon-removal pretreatment process 612 would not even be considered because the carbon in the plant influent wastewater 610, in addition to carbon in excess of what is in the plant influent wastewater 610, would be required for treating the wastewater. By removing so much carbon from the influent stream in the pretreatment process, less oxygen is used in the aerated tank to remove carbon. As such, the main advantages of the system as shown in FIG. 6 is that methane is produced, and that less air or oxygen is required in the Anox-P process 620. Additionally, the size of the tanks required for the Anox-P process 620 may decrease as compared to the Anox-P process when carbon is not removed by a pretreatment process.

The carbon-removal pretreatment process 612 may utilize various technologies that are capable of removing a substantial amount of carbon from an influent stream. A few of these technologies are listed and described herein for exemplary purposes only, and are not meant to limit embodiments of the present invention. For instance, some of these carbon-removing technologies may include an anaerobic process, such as an upflow anaerobic sludge blanket (UASB) reactor, a chemically enhanced primary treatment (CEPT), and a one-stage activated sludge system (sometimes referred to as the "A" in the A/B process). Again, these technologies are listed for exemplary purposes only, as there are other available technologies not listed herein for the sake of brevity. More details on each of these exemplary technologies are discussed herein with respect to subsequent figures.

In embodiments, the carbon that is removed from the plant influent wastewater 610 takes the form of methane ($CH_4$) and/or carbon dioxide ($CO_2$). In one embodiment, a biogas 614 comprising methane and carbon dioxide if formed. The biogas 614, once formed, is directed to other processes that are not described herein, but collectively referred to as biogas utilization 616. This biogas 614, for example, may be used for energy in fuel cells, microturbines, generators, etc. to generate electric power to offset part or all of the electric power used at the water treatment plant. Here, the carbon dioxide may be removed prior to being used in these systems. Alternatively, the biogas 614 may be treated (e.g., removal of carbon dioxide) and upgraded, such as by removing the majority of the carbon dioxide to produce natural gas, which can be used in a compressed form to produce compressed natural gas, CNG, or alternatively can be liquefied to produce liquefied natural gas, LNG. In one instance, about 60% of the carbon present in the plant influent wastewater 610 is removed by way of the processes and reactions that occur in the carbon-removal pretreatment process 612 such that about 40% of the carbon is left in the pretreated stream 618. In another instance, about 70% of the carbon present in the plant influent wastewater 610 is removed by way of the processes and reactions that occur in the carbon-removal pretreatment process 612 such that about 30% of the carbon is left in the pretreated stream 618. In yet another instance, less than 60% of the carbon, such as 45% of the carbon is removed from influent stream by way of the carbon-removal pretreatment process 612. The biogas 614 itself, in one embodiment, is comprised of up to 80% methane. The other portion of the biogas 614 may be a mixture of carbon dioxide, nitrogen, and hydrogen sulfide in different proportions. The proportion of methane to the other portion may vary significantly depending on operational conditions of the wastewater treatment plant, and thus the examples provided herein are for exemplary purposes only and are not meant to limit embodiments of the present invention. For instance, the percentage of methane in one embodiment may be 50%, but in an alternate embodiment may be 80%. As mentioned, compared to traditional wastewater treatment systems, much less carbon is required using the embodiments described herein to convert nitrogen in the ammonia to nitrogen gas, water, and carbon dioxide. As such, it is feasible to remove a large percentage of the carbon from the plant influent wastewater, such that enough carbon is still available in the Anox-P process to convert nitrogen to the products listed above. Using other systems that similarly treat wastewater, it would not be possible to remove this amount of carbon, or any carbon at all, as these systems typically require the addition of carbon, in addition to the carbon present in the wastewater. Combining the carbon removal pretreatment and Anox-P process enables a high-efficiency process that removes carbon, nitrogen, phosphorus, and fermentation of particulate and dissolved organic matter from wastewater without the need for external sources of carbon and recovering energy in the form of biogas.

In one embodiment, conditions in the carbon-removal pretreatment process 612 include a temperature of 18° C. or higher. When temperatures are less than this, the same results can be obtained but with efficiencies that are slightly lower, such as a carbon removal of around 40-60%, instead of closer to 70%. In one instance, a portion of the plant influent wastewater 610 is diverted prior to entering the carbon-removal pretreatment process 612 and is mixed in with the pretreated stream 618. This may occur when there is a high ammonia concentration, or high amounts of nitrogen in this stream, such as is the case with raw sewage with the food industry wastewater components or some water reuse applications. Some of the incoming stream may be bypassed so that there is more carbon in the pretreated stream 618 before it enters the Anox-P process 620. When ammonia or nitrogen levels in general are high, more carbon is needed to remove the nitrogen in the Anox-P process 620.

Figure 7:
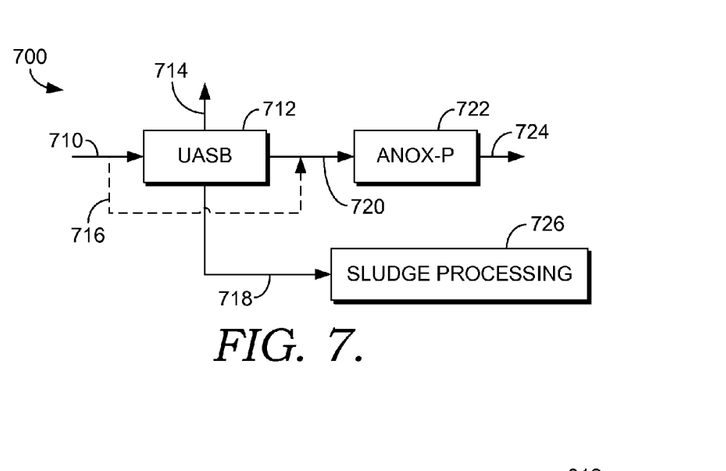
FIG. 7 illustrates a schematic view of a wastewater treatment process that utilizes an upflow anaerobic sludge blanket (UASB) reactor, in accordance with an embodiment of the present invention.

FIG. 7 illustrates a schematic view 700 of a wastewater treatment process that utilizes an upflow anaerobic sludge blanket (UASB) reactor, in accordance with an embodiment of the present invention. Generally, a UASB reactor is a methanogenic digester that produces, at least, methane. A UASB reactor is a form of an anaerobic digester that is used, typically, in the treatment of wastewater. An anaerobic process is used by the UASB reactor wherein a blanket of granular sludge is formed that is suspended in the tank. Generally, wastewater flows upwards through the sludge blanked such that the wastewater is treated by anaerobic microorganisms. In some cases, flocculants are used to aid the suspension of the sludge blanket. A by-product comprising methane, typically in high concentrations, is produced. As mentioned, the biogas may be captured and used as an energy source, such as to offset energy requirements of the wastewater treatment plant. The temperature in the UASB reactor is typically 18° C. or higher. Further conditions of the UASB reactor include a hydraulic retention time of at least 3 to 24 hours, and the sludge retention time is at least 15 days. Even further, overflow velocity is around or less than 3 feet/hour. The biochemical processes in typical UASB reactors typically include hydrolysis or solubilization, acidogenesis or acetogenesis, and methanogenesis. The first step of hydrolysis typically takes 10-15 day for complex organics to be solubilized so that they can be absorbed into the bacteria cells where they are degraded by endoenzymes. The second step of acidogenesis utilizes another group of organisms to form organic acids. The third step of methanogenesis involves methane-producing anaerobic bacteria to complete a decomposition process.

As shown in FIG. 7, plant influent wastewater 710 is directed into a UASB reactor 712. As a result of the reactions that take place in the UASB reactor 712, biogas 714 is produced, which typically includes methane, nitrogen, and carbon dioxide. Also from the UASB reactor 712 is a stream of sludge 718, which is directed to sludge processing 726. In some instances, a portion 716 of the plant influent wastewater 710 is diverted around the UASB reactor 712 to the pretreated stream 720. This typically occurs when the plant influent wastewater 710 includes a high amount of ammonia such that more carbon is needed in the Anox-P process 722. The pretreated stream 720 then flows to the Anox-P process 722, which produces plant effluent 724.

Figure 8:
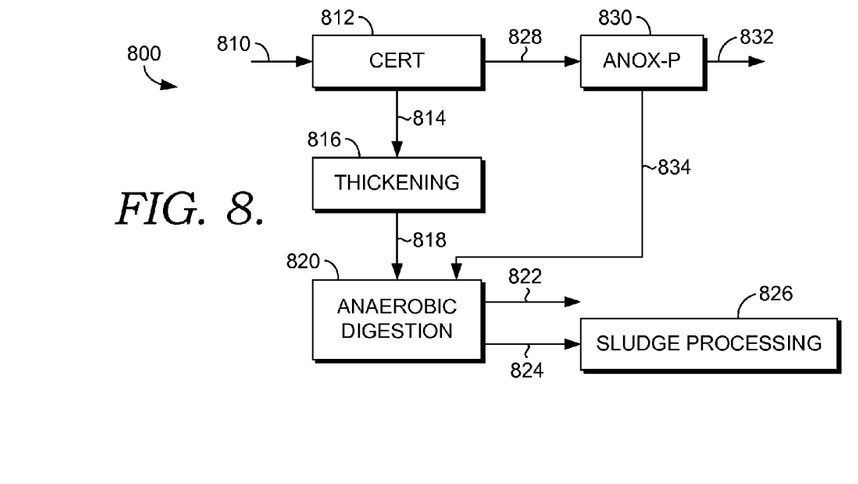
FIG. 8 illustrates a schematic view of a wastewater treatment process that utilizes chemically enhanced primary treatment (CEPT), in accordance with an embodiment of the present invention.

Turning now to FIG. 8, a schematic view 800 of a wastewater treatment process that utilizes chemically enhanced primary treatment (CEPT) is shown, in accordance with an embodiment of the present invention. Generally, CEPT involves chemicals, such as metal salts and/or polymers, being added prior to a primary sedimentation basin such that the chemicals cause suspended particles to clump together via coagulation and flocculation. This provides for a more thorough and faster aggregation time for the particles such that the treatment efficiency is enhanced. Many times, no residual metals are present in the supernatant. Some of the other chemicals used in CEPT may include ferric chloride and aluminum sulfate. A CEPT tank, such as a settling tank, may be used in the CEPT process. Advantages of CEPT to other processes include a more affordable and efficient option when compared to conventional types of treatment. Typically, CEPT processes consist of bar screens, a grit chamber, solid-liquid separation step such as a settling tank, which in one embodiment is a primary clarifier. Other types of solid-liquid separation steps can also be used, such as screening or dissolved air flotation.

As shown in FIG. 8, the plant influent wastewater 810 enters the CERT 812, where sludge 814 from the CERT 812 is first directed to thickening 816, then the sludge 816 is directed to anaerobic digestion 820. As a result of anaerobic digestion 820, biogas 822 is formed, which consists, at least, of methane and carbon dioxide. Further, sludge 824 from the anaerobic digestion 820 is sent to sludge processing 826. From the CERT 812, pretreated effluent 828 is sent to the Anox-P process 820, where plant effluent 832 is generated having much reduced amounts of nitrogen, phosphorus, etc. Excess sludge 834 from the Anox-P process 830 is sent to the anaerobic digestion 820 for stabilization and additional methane generation.

Figure 9:
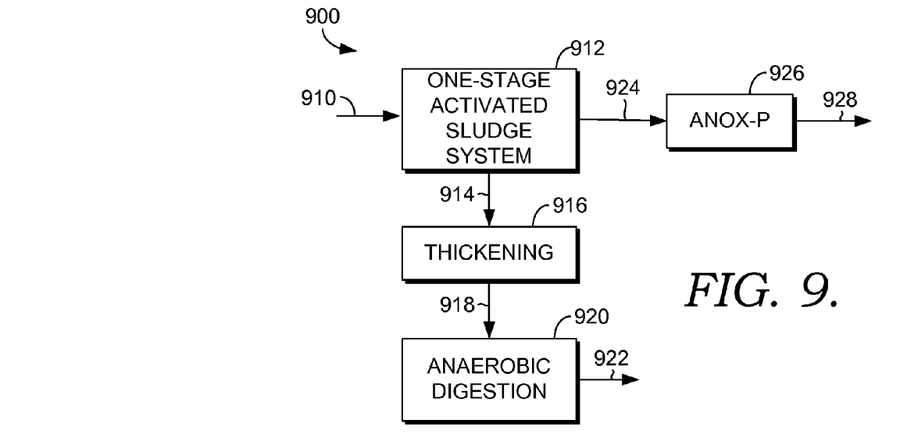
FIG. 9 illustrates a schematic view of a wastewater treatment process that utilizes a one-stage activated sludge system, in accordance with an embodiment of the present invention.

Referring to FIG. 9, a schematic view 900 of a wastewater treatment process that utilizes a one-stage activated sludge system is depicted, in accordance with an embodiment of the present invention. A two-stage activated sludge system is typically referred to as the AB process, wherein the first stage, or "A" stage is for COD reduction using a grit tank, bioreactor, and intermediate clarifier, and the second stage, or "B" stage is for nitrification and N-removal and typically includes a bioreactor and a secondary clarifier. However, in the embodiment of FIG. 9, only the first stage is utilized while the second stage is replaced with the Anox-P process as described herein. The effluent is directed to the Anox-P process for further processing. In some embodiments, up to 90% of the carbon present in the influent stream may be removed by way of the one-stage activated sludge system. The one-stage activated sludge system depicted in FIG. 9 may have a sludge retention time (SRT) of 0.5 days. It is typically a high-rate but low SRT of less than one day, and sometimes as low as 0.5 days. The COD removal (removal of carbon) is around 70-80%.

As shown in FIG. 9, plant influent wastewater 910 enters the one-stage activated sludge system 912. Excess sludge 914 from this system flows to thickening 916, and then the sludge 918 flows to anaerobic digestion. As a result of the anaerobic digestion 920, biogas 922 is formed, and may include methane and carbon dioxide. The pretreated effluent 924 from the one-stage activated sludge system 912 enters the Anox-P process 916, where plant effluent is formed by the removal of nitrogen, phosphorus, etc.

Figure 10:
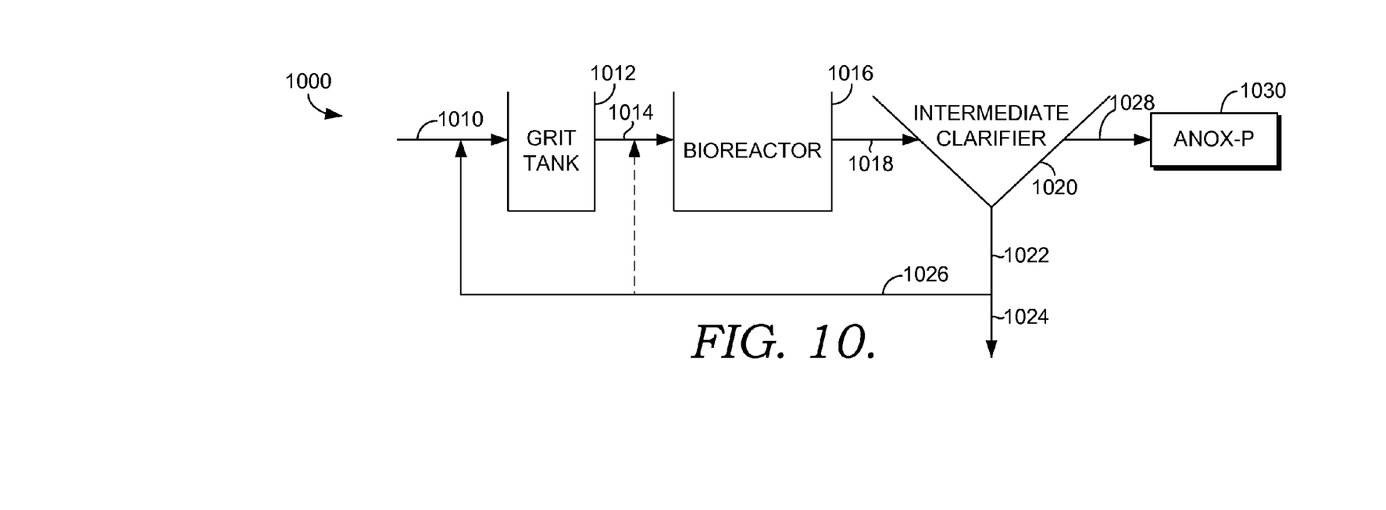
FIG. 10 illustrates a schematic view of a wastewater treatment process that utilizes a one-stage activated sludge system, in accordance with an embodiment of the present invention.

FIG. 10 illustrates a schematic view 1000 of a wastewater treatment process that utilizes a one-stage activated sludge system, in accordance with an embodiment of the present invention. FIG. 10 illustrates a more detailed view of the one-stage activated sludge system 912 of FIG. 9. The plant influent wastewater 1010 is directed to a grit tank 1012, whose effluent 1014 is sent to a bioreactor 1016. From the bioreactor 1016, the effluent 1018 is sent to an intermediate clarifier 1020. The intermediate clarifier 1020 marks the end of the one-stage activated sludge system, such that the pretreated effluent 1028 is sent to the Anox-P process 1030 for further processing. A portion of the sludge 1022 from the intermediate clarifier 1020 may be recycled to the stream entering the grit tank 1012 as return activated sludge 1026, and a portion is diverted for further treatment as excess sludge 1024.

Figure 11:
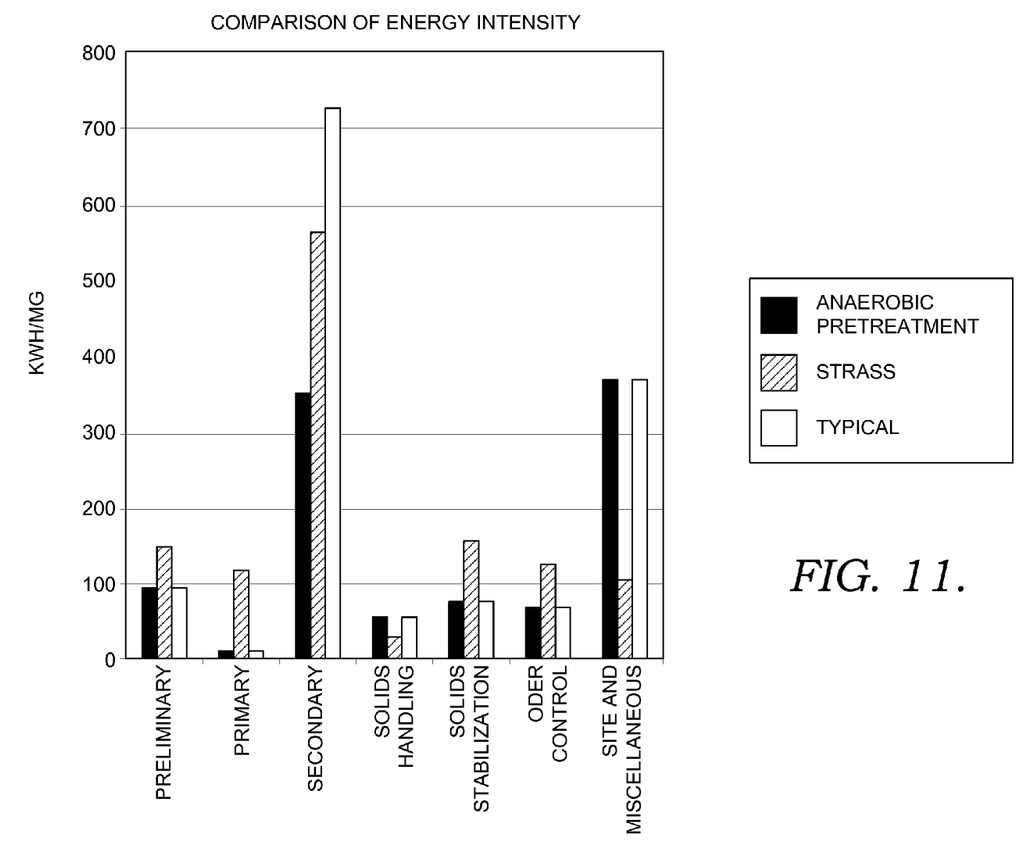
FIG. 11 illustrates a bar graph showing a comparison of energy intensity using various water treatment systems, in accordance with an embodiment of the present invention.

Turning now to FIG. 11, a bar graph is shown of a comparison of energy intensity using various water treatment systems, in accordance with an embodiment of the present invention. Energy utilization is compared and shown in FIG. 11. The bar graph compares a conventional nitrification denitrification process (labeled "typical"), with results from an energy-neutral wastewater treatment plant ("Strass"), and finally with anaerobic pretreatment combined with Anox-P treatment, as described herein ("Anaerobic pretreatment+Anox P"). As shown, the energy required for anaerobic pretreatment combined with the Anox-P system is reduced when compared with the other systems. One reason for this is that energy utilization required for aeration is about 50% of other systems, even though full nitrification-denitrification is still achieved, even without an external carbon source. In one embodiment, sludge from the pretreatment process and waste activated sludge from the Anox-P process undergo anaerobic digestion. The biogas from the digestion process may be utilized for on-site energy generation.

Figure 12:
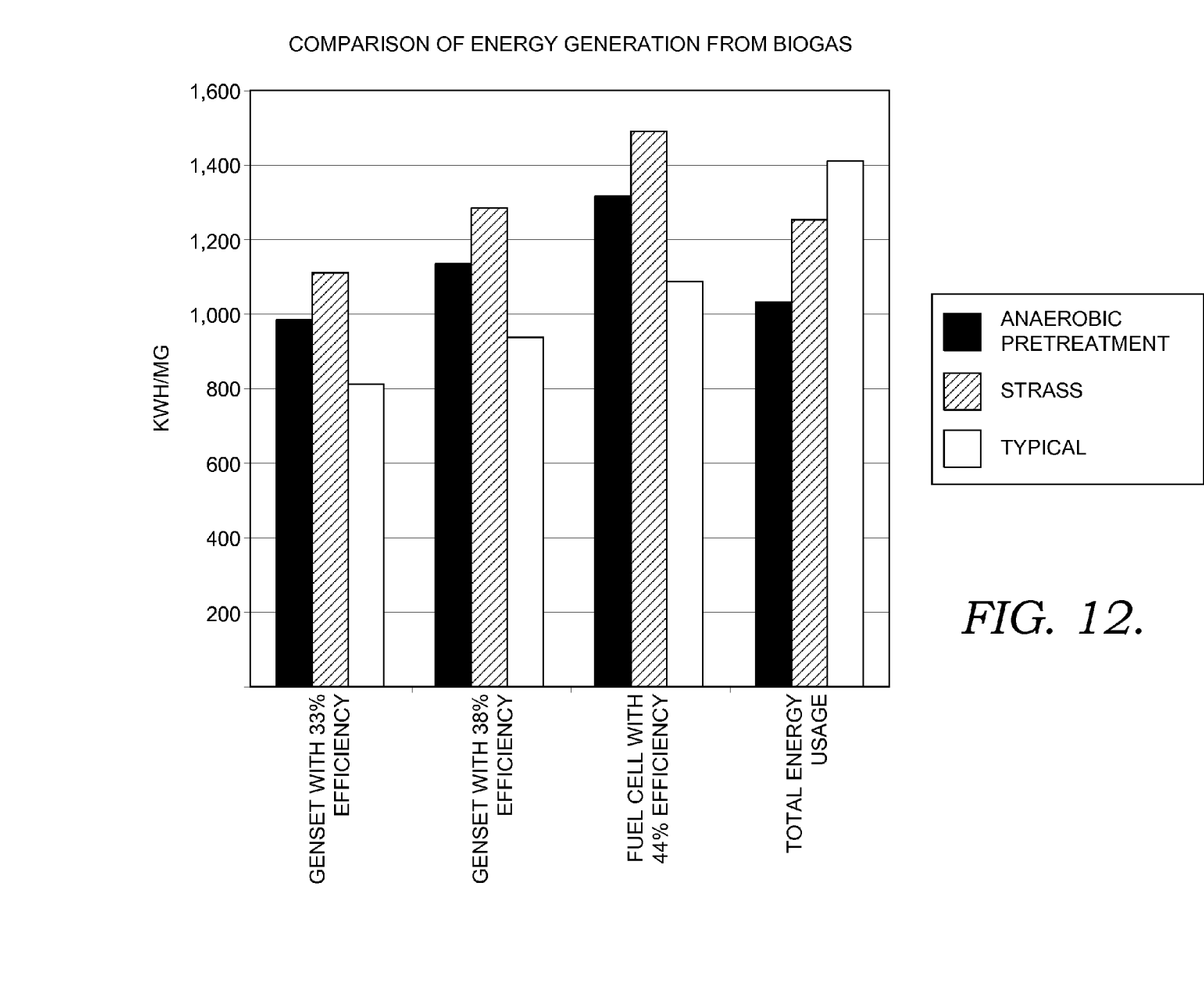
FIG. 12 illustrates a bar graph showing a comparison of energy generation from biogas, in accordance with an embodiment of the present invention.

Referring to FIG. 12, a bar graph illustrates a comparison of energy generation from biogas, in accordance with an embodiment of the present invention. The energy generation shown in FIG. 12, in one embodiment, is from anaerobic digestion of the sludge produced from various processes. FIG. 12 illustrates the energy conversion efficiency from energy in the produced methane converted to electric energy.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure. Further, alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A process for treating wastewater to simultaneously remove organic matter, nitrogen, and phosphorus with energy recovery, the process comprising:
   providing a wastewater stream in a pretreatment tank that produces, at least, excess sludge, biogas, and a pretreated stream, wherein the pretreated stream has 45% to 70% less carbon than the wastewater stream and the biogas comprises at least methane and carbon dioxide;
   flowing the pretreated stream and return activated sludge to an anoxic tank operating under anoxic conditions;
   mixing the pretreated stream and the return activated sludge in the anoxic tank to form a mixed liquor and to initiate phosphorus release and fermentation of particulate organic matter and dissolved organic matter;
   transferring the mixed liquor to an aerated tank operating under microaerophilic conditions, to simultaneously effectuate nitrification, denitrification, phosphorous release, and phosphorus uptake in the aerated tank; and
   transferring the mixed liquor to a membrane tank that separates treated effluent from activated sludge containing microorganisms, wherein a first portion of the activated sludge is returned to the anoxic tank as the return activated sludge.

2. The process of claim 1, wherein the wastewater stream is plant influent wastewater that is to be treated by carbon removal.

3. The process of claim 2, wherein the biogas is treated such that it can be used to power a wastewater treatment plant that treats the plant influent wastewater by offsetting energy requirements of the wastewater treatment plant.

4. The process of claim 1, wherein the biogas comprises about 60% of the methane.

5. The process of claim 1, wherein the pretreatment tank is an upflow anaerobic sludge blanket (UASB) reactor.

6. The process of claim 1, wherein the microaerophilic conditions in the aerated tank promote the fermentation of the particulate organic matter in the mixed liquor and allow for development of a microbial population used for phosphorus removal.

7. The process of claim 1, wherein a portion of the wastewater stream bypasses the pretreatment tank and is directed to the anoxic tank.

8. The process of claim 1, wherein the pretreatment tank utilizes a one-stage activated sludge system.

9. The process of claim 1, wherein a second portion of the activated sludge is transferred to the aerated tank operating under microaerophilic conditions.

10. A method for treating a wastewater stream while recovering energy, the method comprising:
    providing the wastewater stream in a pretreatment tank that comprises anaerobic microorganisms that react with the wastewater stream by removing carbon to produce biogas and a pretreated stream, wherein the pretreated stream has 45% to 70% less carbon than the wastewater stream and wherein the biogas comprises at least methane and carbon dioxide;
    upgrading the biogas produced by removing a majority of the carbon dioxide;
    using the upgraded biogas to generate electric power to offset part or all of electric power used at a water treatment plant that is treating the wastewater stream;
    flowing the pretreated stream to at least two tanks in series for removal of organic matter, nitrogen, and phosphorus;
    in the at least two tanks, separating excess sludge from treated effluent after removal of organic matter, nitrogen, and phosphorus; and
    returning the excess sludge to the pretreatment tank for additional carbon removal, wherein biogas produced from the additional carbon removal is upgraded and used to generate additional electric power.

11. The method of claim 10, wherein about 60% of the carbon present in the wastewater stream is removed by a carbon removal pretreatment processes.

12. The method of claim 10, wherein the biogas is comprised of up to 80% methane.

13. The method of claim 10, wherein at least one of the two or more tanks comprises an anoxic tank and wherein phosphorus release occurs in the anoxic tank.

14. The method of claim 10, wherein at least one of the two or more tanks comprises an aerated tank and wherein nitrification, denitrification, phosphorus release, and phosphorus uptake occur simultaneously in the aerated tank.

15. The method of claim 14, wherein a concentration of dissolved oxygen in the aerated tank is less than 1.0 mg/l of fluid.

16. A system for treating wastewater to simultaneously remove organic matter, nitrogen, and phosphorus with energy recovery, the system comprising:
a pretreatment tank that receives plant influent wastewater and that comprises anaerobic microorganisms that react with the plant influent wastewater to produce, at least, biogas comprising methane, excess sludge, and a pretreated stream, the pretreated stream having 45% to 70% less carbon than the plant influent wastewater stream;
an anoxic tank that receives the pretreated stream and return activated sludge and mixes them to form a mixed liquor and to initiate phosphorus release and fermentation of particulate organic matter and dissolved organic matter;
an aerated tank that receives the mixed liquor from the anoxic tank, wherein the aerated tank operates under microaerophilic conditions, to simultaneously effectuate nitrification, denitrification, phosphorous release, and phosphorus uptake in the aerated tank; and
a membrane tank that separates plant effluent wastewater from activated sludge, a portion of the activated sludge being recycled to the anoxic tank as the return activated sludge.

17. The system of claim 16, wherein the aerated tank comprises one or more aerated tanks.

18. The system of claim 16, wherein nitrification, denitrification, phosphorus release, and phosphorus uptake occur simultaneously in the aerated tank.

19. The system of claim 16, wherein the concentration of dissolved oxygen in the anoxic tank is less than 0.3 mg/l of the mixed liquor.

* * * * *